(12) United States Patent
Cottard et al.

(10) Patent No.: US 8,910,676 B2
(45) Date of Patent: Dec. 16, 2014

(54) DEVICE FOR LOADING SOLID PARTICLES INTO AN ENCLOSURE

(75) Inventors: Bernard Cottard, Saint Romain de Colbosc (FR); Pascal Leroy, Montivilliers (FR)

(73) Assignee: Total Raffinage Marketing, Puteaux (FR)

( * ) Notice: Subject to any disclaimer, the term of this patent is extended or adjusted under 35 U.S.C. 154(b) by 744 days.

(21) Appl. No.: 13/141,607

(22) PCT Filed: Dec. 23, 2009

(86) PCT No.: PCT/FR2009/052683
§ 371 (c)(1),
(2), (4) Date: Jun. 22, 2011

(87) PCT Pub. No.: WO2010/076522
PCT Pub. Date: Jul. 8, 2010

(65) Prior Publication Data
US 2011/0253249 A1  Oct. 20, 2011

(30) Foreign Application Priority Data

Dec. 31, 2008  (FR) ...................... 08 59163

(51) Int. Cl.
*B65B 1/04* (2006.01)
*B65G 1/00* (2006.01)
*B01J 8/00* (2006.01)
*B65G 69/04* (2006.01)

(52) U.S. Cl.
CPC ............. *B01J 8/003* (2013.01); *B65G 69/0441* (2013.01); *B01J 2208/00778* (2013.01); *B01J 8/002* (2013.01); *B65G 69/0458* (2013.01)
USPC ............ 141/286; 141/67; 406/162; 414/301; 239/687; 239/682

(58) Field of Classification Search
CPC .. B01J 8/002; B01J 8/003; B01J 2208/00778; B01J 2208/00929
USPC ........ 141/1, 67, 286; 414/301, 808, 160, 287; 239/681–684, 687, 689, 654; 406/162
See application file for complete search history.

(56) References Cited

U.S. PATENT DOCUMENTS

| 4,306,829 | A | * | 12/1981 | Loutaty et al. ................. 414/301 |
|---|---|---|---|---|
| 4,433,707 | A | * | 2/1984 | Farnham ........................... 141/1 |
| 4,564,328 | A | | 1/1986 | Loutaty et al. |
| 5,238,035 | A | * | 8/1993 | Poussin et al. ................. 141/286 |
| 5,758,699 | A | | 6/1998 | Haquet et al. |
| 6,805,171 | B2 | * | 10/2004 | Crespin et al. .................. 141/11 |
| 7,878,428 | B2 | * | 2/2011 | Pinon et al. .................... 239/684 |

FOREIGN PATENT DOCUMENTS

| EP | 0 116 246 A1 | 8/1984 |
|---|---|---|
| EP | 0 769 462 A1 | 4/1997 |

OTHER PUBLICATIONS

International Search Report for PCT/FR2009/052683 dated Apr. 10, 2010.

* cited by examiner

*Primary Examiner* — Timothy L Maust
*Assistant Examiner* — Timothy P Kelly
(74) *Attorney, Agent, or Firm* — Sughrue Mion, PLLC

(57) ABSTRACT

The invention relates to a device for loading solid particles into an enclosure, including: a means for supplying solid particles to be dispensed, which can be arranged on the top part of the enclosure to be loaded and which pours the solid particles in a substantially vertical manner into a feeding pipe (1); a mobile device (2) disposed entirely or partially inside the enclosure and under the feeding pipe, including a central shaft (3) rotatably driven by a motor means (4) about a substantially vertical axis and deflector elements (6) having a substantially identical shape and being rotatably secured to the shaft (3), preferably arranged in line with one another at different heights about the shaft (3) and pivotably connected thereto so that they can be raised, for example by centrifugal force; and a feeding pipe (1) at least partially surrounding said central shaft (3) and comprising at least one opening (5) for discharging the solid particles, which opening is provided on the horizontal or side wall thereof. The invention is characterized in that the device includes at least one deflector element (7) disposed on the rotatably driven shaft (3), the width of said deflector element (7) close to the shaft (3) being less than that of the other deflector elements (6), in particular the width of the element close to the shaft is smaller than that of the other deflector elements. The invention also relates to a use of said device and to a loading method involving said device.

21 Claims, 3 Drawing Sheets

DEVICE FOR LOADING SOLID PARTICLES INTO AN ENCLOSURE

CROSS REFERENCE TO RELATED APPLICATIONS

This application is a National Stage of International Application No. PCT/FR2009/052683 filed Dec. 23, 2009, claiming priority based on French Patent Application No. 08 59163, filed Dec. 31, 2008, the contents of all of which are incorporated herein by reference in their entirety.

The invention relates to a device for loading solid particles into an enclosure, which can be used, notably, to improve the shape of the loading profiles of the enclosure, by means of the configuration of the strips forming the moving device required for the dispersion of the particles.

The invention relates more specifically to the loading of fixed bed reactors, notably of the chemical, electrochemical, petroleum or petrochemical type, with solid particles in the divided state, which may for example take the form of balls, grains, cylinders, disks, rods, or bodies of any other shape, and which are generally of relatively small size.

The particles can be, in particular, molecular sieves or solid catalyst grains, generally extruded and formed either in irregular shapes or in the form of rods with single or multiple lobes, whose dimensions can vary according to circumstances from a few tenths of a millimeter to several centimeters.

This application, known as the "dense loading" of catalyst grains in a chemical reactor, will be referred to more specifically in the remainder of the present description, but the device according to the invention is applicable to the loading of any other type of solid particles into any type of enclosure.

For the purposes of the present invention, "dense loading" signifies loading a maximum amount of solid particles, as homogeneously and uniformly as possible, in a minimum of space and a minimum of time, using an optimized shower effect.

There are a number of known methods and devices for increasing the density of a fixed bed of catalyst particles in a chemical reactor. It is a feature common to all of these methods that the particles to be loaded are introduced through the top of the reactor and the individual particles collide with fixed or movable mechanical deflectors during their fall, causing a random deflection of the particles. Theoretically, the particles diverted from their vertical fall trajectory in this way fall individually and freely by a shower effect onto the whole surface of the filling front, where they form a dense, homogeneous deposit.

In the course of its work on the optimization of reactor loading systems, the present applicant has developed a filling device which considerably reduces the steric hindrance of the deflector system and facilitates its installation in reactors, by using a moving device for dispersing the solid particles, comprising flexible deflectors pivotably connected to a rotating shaft. This basic system is described in patent application EP 0 007 854, and improvements of this filling device are disclosed in the applications EP 0 116 246, EP 0 769 462 and EP 1 776 302.

Even if there is a set of high-performance deflectors, the behavior of the catalyst particles during the filling of the reactor may differ from the theoretical behavior described above. The "filling front", also called the "loading profile", that is to say the interface between the catalyst bed and the part of the reactor that has not yet been filled, may sometimes depart substantially from the horizontal plane and/or have humps and/or hollows on the filling front. The catalyst particles, especially if they have an anisotropic shape, can be positioned in preferential directions, thus creating preferential paths for the liquid charge and the reactive gas through the catalyst bed. This may cause the reactor operation to become unsatisfactory, in terms of hydrodynamics for example, and may ultimately cause a loss of profit for the user.

The present applicant is currently able to offer its customers a guaranteed gradient of not more than 10% of the filling front, with a minimum of humps and hollows, but it is constantly seeking to reduce this value and to improve loading performance in order to optimize the operation of reactors filled with its dense loading device.

Additionally, an increase in the catalyst particle loading rate, due to a reduction of the loading time and/or an increase in the volume of the enclosure to be loaded, can lead to the aforementioned types of deformation of the loading profile.

Unsatisfactory filling fronts can be corrected to some extent by varying the rotation speed of the moving device, but in some cases the permeability of the moving device may prove to be insufficient. This may result in an absence, notably a partial absence, or a lower density of catalyst particles at certain points in the reactor cross section. This absence, which may be partial for example, or this lower density may be distributed, notably, in the form of a ring concentric with the axis of rotation of the moving device.

For the purposes of the present invention, the permeability of the moving device is defined as the proportion of the number of solid particles passing through the device without being deflected by it to the total number of particles loaded, and it commonly varies from 2% to 50%.

During extensive research into the method of dense loading of solid particles into an enclosure, notably in relation to the loading of catalyst grains into chemical reactors having different heights and loading diameters, the present applicant has discovered that if the shape of some of the component strips of the moving device is modified, especially at precisely defined locations, a proportion of catalyst particles passes preferentially through this moving device and can be used for the partial or total correction of some or all of the insufficient flatness of the loading profile mentioned above.

Thus the present applicant has developed a device which, while being based on the same principle as the dense loading system (called "Densicat") disclosed in EP 0 769 462, and while being equally simple to install in a reactor and operate, can also improve the loading profiles of any type of reactor.

According to a first aspect, the present invention proposes a device for the loading, particularly the uniform and homogeneous loading, of solid particles into an enclosure, comprising:

a means for feeding solid particles to be distributed, adapted to be positioned on the upper part of the enclosure to be loaded, this means discharging the solid particles in a substantially vertical direction into a feed conduit, a moving device, positioned wholly or partially inside the enclosure and under the feed conduit, comprising a substantially vertical central shaft rotated by a drive means, together with deflector elements of substantially identical shape, fixed to the shaft with respect to rotation, and preferably positioned directly above or below each other, at a plurality of vertical levels around the shaft and pivotably connected to the latter in such a way that they can be raised, for example by the action of centrifugal force, a feed conduit which at least partially surrounds said central shaft and which includes at least one aperture for the discharge of the solid particles, located on a lateral or horizontal wall, this device being characterized in that it contains at least one deflector element positioned on the rotatable shaft in which the surface area of the region of the deflector located near the shaft is smaller than the surface area of the same region of the other deflector elements, and, in particular, the width in the proximity of the shaft is smaller than that of the other deflectors.

In another of its aspects, the invention also proposes the use of this device for loading petroleum, chemical or petrochemical reactors.

In another of its aspects, the invention proposes a method for loading reactors, notably petroleum, chemical or petrochemical reactors, with the device according to the invention.

In the loading device according to the invention, the catalyst particles supplied from the feed means, which can be a hopper or any equivalent member, descend under the action of gravity in the feed conduit, in other words between the inner walls of the feed conduit. The feed conduit includes at least one discharge aperture located in its base, above the dispersion system which, in particular, is formed by the strips. Thus at least some of the particles drop through the discharge aperture onto the dispersion system which is rotated by the central shaft.

In addition to a first feed of solid particles provided through the feed conduit above the moving device, at least one additional feed can be provided. This additional feed can be provided through apertures formed in the feed conduit and located on its vertical and/or horizontal walls. Particles can thus drop onto parts of the flexible deflectors remote from the drive shaft. This can increase the homogeneity of the distribution in the enclosure at long distances from the central axis. By making a judicious choice of the aperture or apertures, any portions of the enclosure which are off-centre with respect to the axis of the moving device can be filled selectively and in a dense and homogeneous way.

The motor which drives the tubular central shaft of the device according to the invention is preferably off-centre with respect to this shaft, and can be supplied with any compressed gas, such as air or nitrogen. The rotary movement of the drive means can be transmitted to the tubular shaft by any appropriate known means, such as a belt, a chain, or a set of gears, or a combination of these means.

The central shaft used in the present invention can be either solid or hollow as described in EP 1 776 302. The latter feature can offer the advantage of providing a passage in the central shaft, for uses including, but not limited to, the housing of measuring apparatus for monitoring the level of the catalyst bed during loading, and/or the extraction of any catalyst dust emitted during the loading.

The deflector elements are preferably positioned directly above or below each other, in such a way that the whole moving device has a void ratio which can vary from 30% to 80%, depending on the dimensions of the strips which are generally used.

In the present description, the term "void ratio of the moving device" denotes the ratio (in %) of the surface area not covered by the deflectors to the total projected surface area of the moving device when the deflector elements are deployed in the enclosure.

Preferably, the rotation speed of the shaft supporting the deflectors is adjusted in accordance with the loading height, the rotation speed being generally within the range from about 25 to about 250 revolutions per minute, and preferably from 40 to 150 revolutions per minute.

The levels of the deflectors, of which there can be two or more, and preferably three or four, are spaced apart by an interval in the range from 2 to 20 centimeters, and preferably from 4 to 10 centimeters.

The strips forming the deflectors have longitudinal dimensions which can be in the range from 10 centimeters to 2 meters, and preferably from 10 cm to one meter. The strips can also be made in any shapes known in the art, for example rectangular, triangular or trapezoidal.

As a general rule, the strips are deflectors of a particular type. In the present description, when the term "strip" is used it can also signify a "deflector" unless specified otherwise.

Each level of deflectors can comprise at least two deflectors, preferably from four to twelve, and even more preferably eight deflectors. These deflectors are positioned around the axis of rotation and preferably have identical shapes. In particular, the Y deflectors are positioned at $360/Y°$ with respect to each other.

In current loading practice, there is a trend towards an increase in solid particle feed rates, which can currently be as high as 30 t/h or above. This may cause the loading profiles to become dependent on this increase in the rate, and possibly to be altered as a result of the increase in the loading rate.

High solid particle flow rates can be achieved by increasing the number of discharge apertures, notably those located on the horizontal and/or vertical walls of the feed conduit, and the size of these apertures can be adjusted, to the maximum value for example.

By varying the rotation speed of the moving device, it may be possible to improve the loading profiles substantially, but this is not always sufficient to achieve the requisite or desired degree of horizontality.

The applicant has surprisingly discovered that better results in terms of the flatness of the loading front are achieved when the shape of the deflectors or strips at the lowest level of the moving device is modified.

At least two, preferably four, and even more preferably eight modified deflectors or strips are installed symmetrically at this third level. In particular, an identical number of deflectors, or strips, are provided at the other two levels of the moving device.

The modification of the shape of these deflectors, or strips, close to their attachment to the rotating central shaft can allow the permeability of the moving device to be adjusted in a specified region of the loading profile.

This modification of the surface of the deflectors, or strips, appears to be related to the "non-conforming" circular loading region as mentioned above.

The change in the shape of the deflectors, or strips, can essentially be concerned with:

a decrease in width in the range from 20% to 80%, preferably from 30% to 70%, and/or a length in the range from 10% to 50%, preferably from 20% to 40%, and preferentially from 20% to 30% of the total length of the strip.

The deflectors present at a single level can be identical to each other. More particularly, the deflectors at the higher levels, particularly at all levels above the lowest level, are identical to each other. The deflectors at the lower levels, particularly those at the lowest level, can be identical to each other.

The device according to the invention can comprise at least two types of deflectors, namely deflectors having what is known as the "reference" size and deflectors having a surface area smaller than that of those of the "reference" size. More particularly, the device according to the invention comprises two types of deflector. In particular, the deflectors having the reference size are identical to each other, and the deflectors having a smaller surface area are identical to each other.

As a general rule, the end of the strip used for its attachment to the moving shaft is not reduced. Preferably, the aforementioned narrowing of the width is the sum of the decreases which are provided symmetrically on each side of the strip with respect to its longitudinal axis and in the part located near the rotation shaft.

The material from which the strips or deflectors is made can be a semi-rigid material, preferably flexible rubber reinforced with a textile fiber, and its thickness can vary from 2 mm to 10 mm and preferably from 3 to 8 mm.

BRIEF DESCRIPTION OF THE DRAWINGS

The invention will now be described with reference to the attached non-limiting drawings, in which.

DETAILED DESCRIPTION OF THE INVENTION

Figure 1:
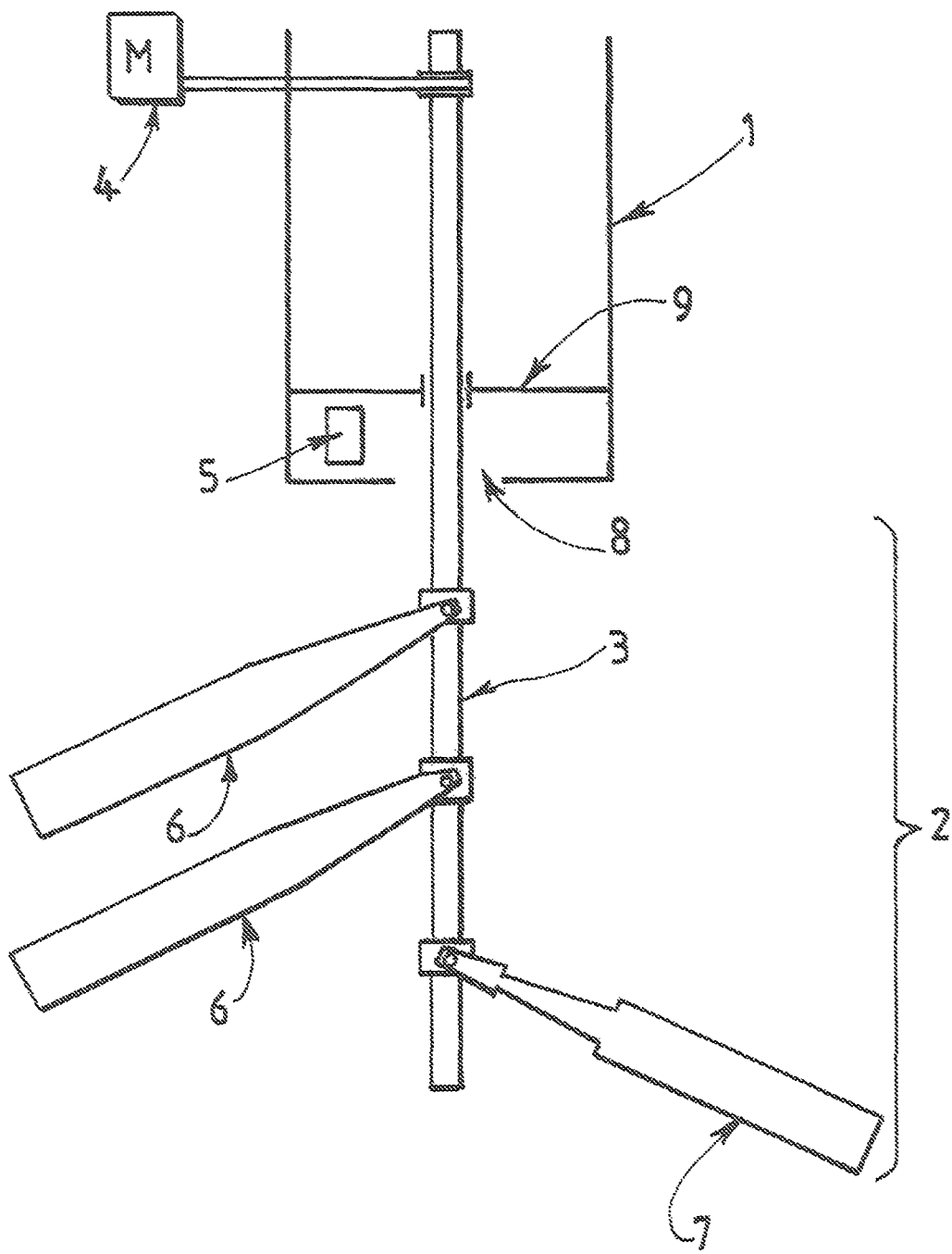
FIG. 1 is a schematic view of the device proposed by the present invention.

The device of FIG. 1 includes a feed hopper (not shown) which is positioned above the reactor and which feeds catalyst particles to the feed conduit (1) by gravity.

The shaft (3) of the moving device (2), rotated by the drive means (4), is positioned in the feed conduit (1), substantially on the longitudinal axis of a circular reactor.

A device (9) for centering and supporting the rotating shaft (3) is positioned in the feed conduit (1).

The catalyst grains fall by gravity through an opening (8) formed in the feed conduit (1) onto the dispersion system formed by the strips (6) and (7) distributed vertically over three levels on the rotating shaft (3).

In order to increase the loading rates, in other words the quantity of catalyst particles fed to the moving device, discharge apertures (5) (only one of which is shown in FIG. 1) are located on the lateral and/or horizontal walls of the feed conduit (1).

The areas of these apertures (5) can generally be adjusted by means of a manually or automatically slidable shutter (not shown) which blocks the discharge aperture to a greater or lesser degree according to the particle flow rate required for loading.

In this drawing, to facilitate the understanding of the invention, the strips (6) and (7) are shown face-on, that is to say as if viewed from above the moving device. Although a single strip is shown for the sake of clarity, there are preferably eight strips at each level, distributed equally in each space at each level and positioned vertically above or below each other.

Each of the eight strips (7) at the lower third level has a region of reduced width in the proximity of its attachment to the rotating shaft (3), in order to increase the permeability of the moving device.

Figure 3:
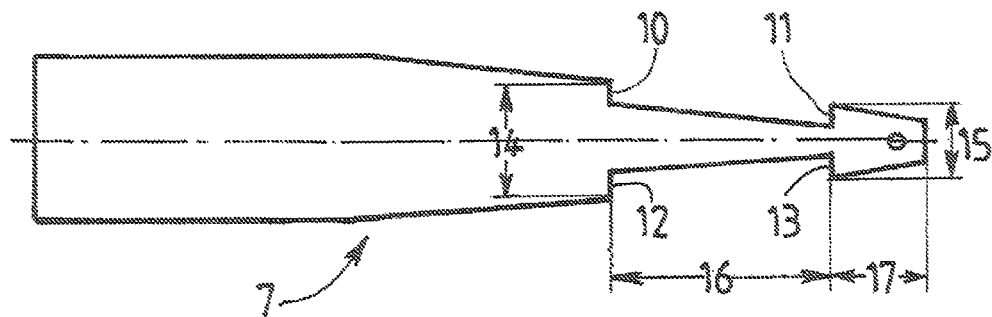
FIG. 3 is a longitudinal view of the same strip installed at the third level of the device proposed by the invention, after the reduction of its width in accordance with the present invention.

A more detailed description of these modified strips is provided in FIG. 3.

Figure 2:
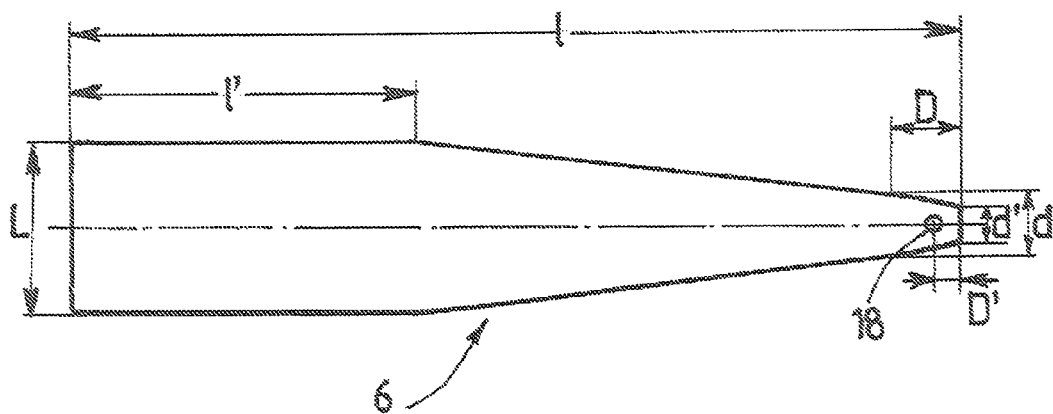
FIG. 2 is a longitudinal view of an example of a strip as used at levels 1 and 2 of the device proposed by the present invention.

In FIG. 2, the dimensions of the strip are expressed in millimeters and correspond, for example, to a type of strip used in a moving device for loading a large chemical reactor with a diameter of up to 5 meters.

More precisely, the distances can be as follows: 1: 800 mm,
l': 300 mm,
L: 150 mm,
D: 40 mm,
D': 20 mm,
d: 50 mm,
d': 30 mm, and
diameter of the aperture 18: 8 mm.

The aperture 18 located in the narrowest part of the strip is to be used for attaching the strip to the strip support positioned on the rotating shaft of the moving device.

The strip is 5 mm thick and it is made from a semi-rigid rubber material reinforced by an internal textile fiber.

In FIG. 3, the shape of this strip has been modified in order to increase its permeability in the loading region close to the central axis of the moving device.

Its width is reduced at (10) and (12), and also at (11) and (13) as shown in the same drawing, by 20 mm, that is to say there is a decrease of the widths (14) (110 mm) and (15) (60 mm) of the strip by 36% and 66% respectively.

This reduction has been carried out over a length (16) of 200 mm, representing 25% of the total length of the strip.

The length (17) (70 mm) of the strip has been left unchanged, to provide optimal fastening to the strip support located on the rotating shaft.

EXAMPLE

The applicant has used the device according to the present invention on a mock-up representing a typical enclosure of a cylindrical chemical reactor used in its refineries.

This mock-up has the following dimensions:
height: 5.00 m,
diameter: 3.80 m.

Two tests were conducted with a dispersion device constructed according to the description given in EP 0 769 462, for test 1, and then with the strips modified according to the present invention, for test 2.

Test Conditions
  type of catalyst: $Al_2O_3$, with a density of 0.85,
  mean dimensions of the catalyst grains: three-lobed shape, diameter 1.5 mm and mean length 2.7 mm,
  quantity of catalyst loaded: 2.5 m$^3$,
  catalyst grain feed rate to the moving device: >30 t/h,
  rotation speed of the moving device: 95 revolutions per minute,
  9 lateral and 9 horizontal discharge apertures open,
  loading time: 2 minutes,
  3 levels of strips,
  8 strips per level
  dimensions of all the strips: length 55 cm, least width 7 cm and greatest width 10 cm, thickness 6 mm,
  strips of trapezoidal shape as described in EP 0 769 362,
  solid central rotation shaft.
Distinctive Conditions of Test 1
  The 8 strips at each of the 3 levels were identical.
Distinctive Conditions of Test 2
  The 8 strips at the third and lowest level of the moving device of test 1 were modified according to the present invention.

They had reductions of 5 cm in their total width, distributed on each side of the longitudinal axis of the strip over a length of 12 cm.

The non-reduced length close to the rotation shaft, used for attaching the strip to the shaft, was 7 cm.

Figure 4:
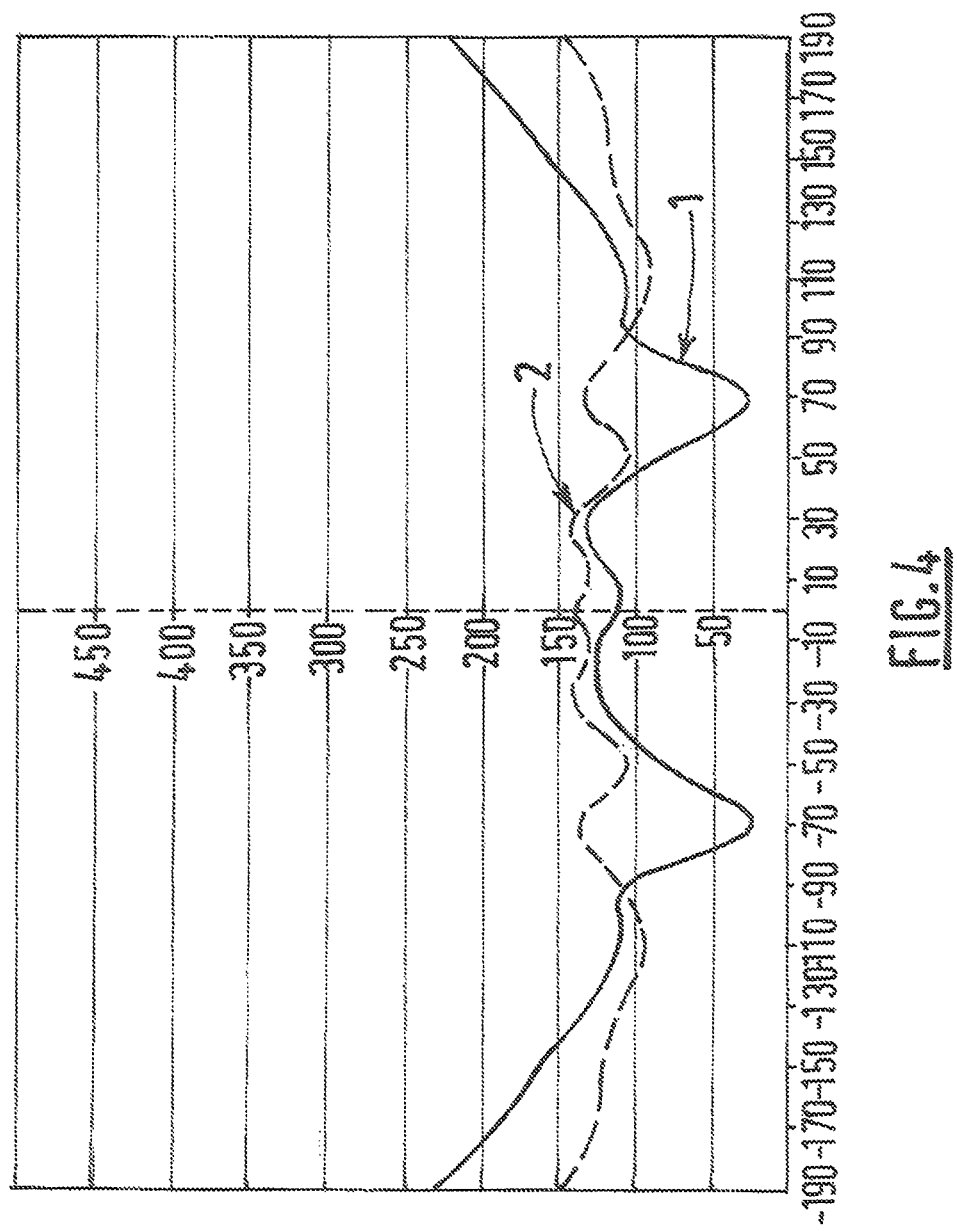
FIG. 4 is a graph showing the height in millimeters of catalyst grains loaded in tests 1 and 2 along the vertical axis, and the diameter of the loaded enclosure in centimeters along the horizontal axis.

In FIG. 4, the vertical axis shows the height in millimeters of catalyst grains loaded in tests 1 and 2, while the horizontal axis shows the diameter of the loaded enclosure in centimeters.

Each of the points of the two curves is a mean value of heights measured at different places on the corresponding circumference.

For test 1, that is to say the test conducted with the moving device composed of 3 levels, each having 8 identical strips (marked "1" in FIG. 4), it can be seen that the centre of the enclosure has a humped shape while at a distance of 70 cm from the central axis, that is to say the axis of the rotation shaft of the moving device, a hollow has formed because of a lack of solid particles. The hump is about 100 mm high, while the hollows are about 70 mm deep.

The maximum slope recorded (excluding the hollows) is 100 mm or (including the hollows) 200 mm, over a horizontal distance (radius of the enclosure) of 190 cm, giving relative values of slope of 5% and 10%; however, these values are still acceptable and in accordance with the loading guarantee of 10% maximum declared to the operator.

For test 2, in which the 8 strips at the third level have been modified according to the present invention, the loading profile (marked "2" in FIG. 4) is markedly flatter, with a maximum difference of about 50 mm between the extremes, equivalent to a corresponding slope of about 2.6%.

According to the evidence of these tests, the use of the invention, which allows the permeability of the moving device of the dispersion device to be adjusted by modification of the strips at the third level, provides a very marked improvement in the loading profile of a catalyst bed in a chemical reactor or, by extension, the loading front of solid particles in an enclosure due to the use of the device according to the present invention.

The invention claimed is:

1. A device for loading solid particles into an enclosure, comprising:
   a means for feeding solid particles to be distributed, adapted to be positioned on an upper part of the enclosure to be loaded;
   a feed conduit which includes a lateral wall, a horizontal wall, and at least one aperture located on the lateral wall or the horizontal wall for the discharge of the solid particles, the means discharging the solid particles in a vertical direction into a feed conduit,
   a moving device, positioned wholly or partially inside the enclosure under the feed conduit, comprising
     a drive means;
     a vertical central shaft rotated by the drive means about a vertical axis, the central shaft being surrounded by the feed conduit;
   a plurality of deflector elements of identical shape, fixed to the central shaft with respect to rotation, and arranged on a plurality of levels around the central shaft such that the plurality of deflector elements are positioned directly above or below each other, and pivotably connected to the central shaft in such a way that the plurality of deflector elements can be raised by the action of centrifugal force,
   at least one modified deflector element positioned on the central shaft in which a surface area and a width of a region of the at least one modified deflector element located at a position between 10% and 50% of a total length of the at least one modified deflector element measured from a tip of the deflector connected to the central shaft is smaller than a surface area and a width of a corresponding region of each of the plurality of deflector elements other than the at least one modified deflector element.

2. The device as claimed in claim 1, characterized in that the plurality of deflector elements are strips made from semi-rigid rubber.

3. The device as claimed in claim 1, characterized in that the plurality of deflector elements are arranged on three levels around the central shaft.

4. The device as claimed in claim 1, characterized in that the device includes two modified deflector elements.

5. The device as claimed in claim 1, characterized in that a plurality of the at least one modified deflector element are positioned on the same level.

6. The device as claimed in claim 1, characterized in that the decrease in the width of the at least one modified deflector element is in the range from 20% to 80%, of an initial width of the at least one modified deflector element.

7. The device as claimed in claim 1, characterized in that the plurality of the deflector elements are positioned symmetrically on the central shaft.

8. The device as claimed in claim 1, characterized in that the plurality of the deflector elements are equally distributed at each of the plurality of levels.

9. The device as claimed in claim 1, characterized in that eight deflector elements are positioned at each of the plurality of levels.

10. The device as claimed in claim 1, characterized in that a void ratio of the deflector elements is in the range from 30% to 80%.

11. The device as claimed in claim 1, characterized in that the central shaft can be a solid tube or a hollow tube.

12. The device as claimed in claim 1, characterized in that the rotation speed of each of the plurality of the deflector elements is in the range from 25 to 250 rpm.

13. A method for loading petroleum, chemical or petrochemical reactor, comprising a step of loading solid particles into the reactor via the device as claimed in claim 1.

14. The device as claimed in claim 1, characterized in that the device includes four modified deflector elements.

15. The device as claimed in claim 1, characterized in that the device includes eight modified deflector elements.

16. The device as claimed in claim 1, characterized in that a plurality of the at least one modified deflector elements are positioned on a third of the plurality of level.

17. The device as claimed in claim 1, characterized in that a plurality of the at least one modified deflector elements are positioned on a lowest of the plurality of levels.

18. The device as claimed in claim 1, characterized in that the decrease in the width of the at least one modified deflector element is located at the position between 20% to 40% of the total length of the at least one modified deflector element.

19. The device as claimed in claim 18, characterized in that the decrease in the width of the at least one modified deflector element is located at the position between 20% to 30% of the total length of the at least one modified deflector element.

20. The device as claimed in claim 12, characterized in that the rotation speed of each of the plurality of deflector elements is in the range from 40 to 150 rpm.

21. The device as claimed in claim 6, characterized in that the decrease in the width of the at least one modified deflector element is in the range from 30% to 70%, of the initial width of the at least one modified deflector element.

* * * * *